(12) United States Patent
Deprun et al.

(10) Patent No.: US 8,495,213 B2
(45) Date of Patent: Jul. 23, 2013

(54) TERMINAL AND METHOD FOR MANAGING SECURE DEVICES

(75) Inventors: Jean-Francois Deprun, Anyang-si (KR); David Dana, Anyang-si (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 12/937,141

(22) PCT Filed: Jan. 19, 2009

(86) PCT No.: PCT/KR2009/000269
§ 371 (c)(1),
(2), (4) Date: Oct. 8, 2010

(87) PCT Pub. No.: WO2009/125919
PCT Pub. Date: Oct. 15, 2009

(65) Prior Publication Data
US 2011/0029671 A1    Feb. 3, 2011

Related U.S. Application Data

(60) Provisional application No. 61/044,022, filed on Apr. 10, 2008.

(51) Int. Cl.
*G06F 15/173*    (2006.01)

(52) U.S. Cl.
USPC .................... 709/225; 709/227; 709/229

(58) Field of Classification Search
USPC .......................... 709/225, 227, 229
See application file for complete search history.

(56) References Cited

U.S. PATENT DOCUMENTS

| | | | |
|---|---|---|---|
| 7,941,656 B2 * | 5/2011 | Hans et al. ........................ 713/2 |
| 2002/0037714 A1 * | 3/2002 | Takae et al. .................... 455/419 |
| 2005/0086479 A1 | 4/2005 | Ondet et al. | |
| 2005/0184164 A1 * | 8/2005 | de Jong ......................... 235/492 |
| 2008/0295159 A1 | 11/2008 | Sentinelli | |
| 2010/0093396 A1 * | 4/2010 | Roundtree .................... 455/558 |

FOREIGN PATENT DOCUMENTS

| KR | 10-2003-0037830 A | 5/2003 |
| KR | 10-2004-0069841 A | 8/2004 |
| KR | 10-2006-0135630 A | 12/2006 |

* cited by examiner

*Primary Examiner* — Nicholas Taylor
(74) *Attorney, Agent, or Firm* — Birch, Stewart, Kolasch & Birch, LLP (57) ABSTRACT

A mobile terminal and method for managing secure devices associated with the terminal are discussed. According to an embodiment, the method includes acquiring at least one of availability information and delegation information from each of at least one secure device associated with the mobile terminal; establishing a secure device delegation rule set for the at least one secure device based on the acquired information; receiving a request for establishing a communication connection with a secure device from a server; and establishing a communication connection between the server and one of the at least one secure device based on the secure device delegation rule set.

7 Claims, 4 Drawing Sheets

Fig. 3

TERMINAL AND METHOD FOR MANAGING SECURE DEVICES

This Non-Provisional application is the National Phase of PCT/KR2009/000269 filed on Jan. 19, 2009, which claims priority under 35 U.S.C. 119(e) to U.S. Provisional Application No. 61/044,022 filed on Apr. 10, 2008, all of which are hereby expressly incorporated by reference into the present application.

TECHNICAL FIELD

The present invention relates to a terminal and method for managing secure devices associated with the terminal by delegating tasks of one secure device to another secure device.

BACKGROUND ART

Technologies associated with mobile terminals are being rapidly developed and standardized, and such technologies offer better and more sophisticated services and products to various users. In this regard, terminals are being configured to provide a variety of interesting applications and services (e.g., banking application, MP3 application, etc.) to end users. Such applications may be loaded on one or more secure devices, which are then provided with the terminal.

Commonly used secured devices are SIM cards (Subscriber Identification Module) or SD (Secure Digital) cards. Each of the SIM card and the SD card, which may be provided in the terminal, can be updated by its own service provider using an OTA (Over-The-Air programming) operation. For instance, to install an application or update contents in the SIM card, the server responsible for this SIM card sends an OTA connection request to the SIM card through the terminal. Once the OTA connection is made between the SIM card and the server, the server sends update data or application to be loaded on the SIM card.

However, if the SIM card is not available (e.g., its memory is full or user recently removed it from the terminal), then the server's attempt to update the contents or install the new application in the SIM card fails, and the updating/installation cannot occur. Currently, that ends the updating/installation process, and there is no other way to complete the updating/installation process. As a result, the server is not able to update the data or load the new application to the SIM card.

Accordingly, there is a need to manage various secure devices of the terminal, especially when some of the secure devices become unavailable.

DISCLOSURE OF INVENTION

Technical Problem

A technical goal of the present invention is to provide a terminal and method for managing secure devices associated with the terminal, which address the limitations and disadvantages associated with the related art.

Another technical goal of the present invention is to provide a terminal and method for delegating tasks of one secure device to another device as needed.

Another technical goal of the present invention is to provide a terminal and method for establishing a secure device delegation rule set and processing incoming requests according to the secure device delegation rule set.

Another technical goal of the present invention is to provide a terminal and method for processing an incoming request for a particular secure device when the particular secure device is unavailable.

Another technical goal of the present invention is to provide a terminal and method for storing contents for a first secure device to a second secure device when the first secure device is unavailable, and then transferring the stored contents from the second secure device to the first secure device when the first secure device becomes available again.

Technical Solution

According to an aspect of the present invention, there is provided a method for managing communication between a server and a secure device associated with a mobile terminal by using the mobile terminal, the method comprising: acquiring at least one of availability information and delegation information from each of at least one secure device associated with the mobile terminal; establishing a secure device delegation rule set for the at least one secure device based on the acquired information; receiving a request for establishing a communication connection with a secure device from the server; and establishing a communication connection between the server and one of the at least one secure device based on the secure device delegation rule set.

According to another aspect of the present invention, there is provided a mobile terminal for managing communication between a server and a secure device associated with the mobile terminal, the mobile terminal comprising: a transceiver configured to transmit or receive signals to or from another device; and a controller configured to control the transceiver, wherein the controller is further configured to: acquire at least one of availability information and delegation information from each of at least one secure device associated with the mobile terminal; establish a secure device delegation rule set for the at least one secure device based on the acquired information; receive a request for establishing a communication connection with a secure device from the server; and establish a communication connection between the server and one of the at least one secure device based on the secure device delegation rule set.

Advantageous Effects

The present invention allows a terminal to delegate a task of one secure device to another secure device based on a secure device delegation rule set. As a result, no task or incoming request is missed or not completed, and the terminal can effectively manage the various secure devices so that their resources can be shared with one another.

MODE FOR THE INVENTION

Hereinafter, preferred embodiments of the present invention will be described in detail with reference to the accompanying drawings. The following embodiments should be considered in descriptive sense only and not for purpose of limitation.

Figure 1:
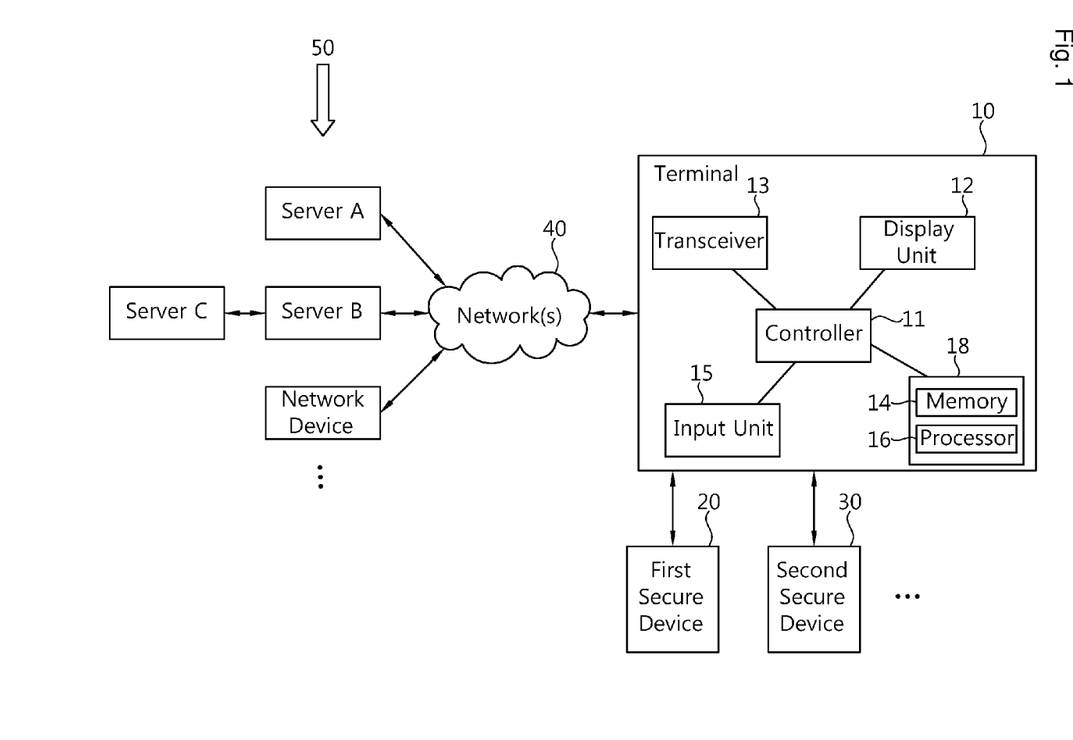
FIG. 1 is a block diagram of a mobile communication system according to an embodiment of the present invention.

FIG. 1 is a block diagram of a mobile communication system according to an embodiment of the present invention. Referring to FIG. 1, the system includes a terminal 10, one or more secure devices 20, 30, . . . associated with the terminal 10, and a plurality of servers A, B, C, . . . and other network devices 50 for selectively communicating with the terminal 10 through network(s) 40. All the components of the system are operatively coupled and configured. Although only the first and second secure devices 20, 30 are shown, the present invention encompasses use of any number of secure devices. The secure devices are also referred to herein as secure elements, and may be preferably storage devices.

The terminal 10 is configured to communicate with other terminals or network entities via the network 40. The network 40 can be, e.g., any mobile communication network such as a 2G or 3G network. The secure devices 20, 30 can be inserted into the terminal 10 or may be connected to the terminal 10 wirelessly or via wired connectors.

The terminal 10 includes a controller or processor 11 such as a microprocessor or application processor, a display unit 12 (e.g., LCD panel) for displaying contents, a transceiver 13 for transmitting and receiving various signals, an internal memory 14, and an input unit 15 such as keypad, touch screen, etc. The terminal 10 can also include other known components such as a camera module, an audio output unit, additional memories, etc. All components of the terminal 10 are operatively coupled and configured.

The terminal 10 itself can include its own secure device. For instance, the internal memory 14 or part thereof (or another memory) of the terminal 10 in conjunction with the controller 11 or part thereof (or another controller/processor 16) of the terminal 10 may constitute and be configured to function as a secure device 18 similar to the secure devices 20, 30, . . . .

The terminal 10 can be any device configured to communicate with the secure devices 18, 20, 30 and with other entities such as servers and other terminals through the network 40 or other means. For example, the terminal 10 is preferably a mobile terminal such as a mobile phone, a smart phone device, a computer notebook, a handset, a user equipment, a mobile station, a pager, an MP3 player, a portable audio/video recording/reproducing device, a PDA, a GPS device, a Bluetooth device, etc.

Each of the secure devices 18, 20, 30 can include a memory or storage unit for storing contents, and a controller such as a processor for controlling the respective memory. The contents stored in each of the secure devices can be any data or information, e.g., applications/programs such as secure applications, banking applications, transport applications, NFC applications, etc., files such as multimedia files, MP3 files, xHTML files, static files, dynamic files, etc., certified keys and other security data, subscriber information, terminal information, service provider information, video/audio data, etc. These are merely examples and the invention encompasses all types of contents.

If desired, each of the secure devices 18, 20, 30 can also include any known encryption and decryption modules and/or authentication module for providing more secure data communication. For example, the secure devices can use known TLS (Transport Layer Security) protocols for providing secure data communication using public key infrastructure (PKI). According to an embodiment, any communication between the secure device and the server 50 may be securely provided using known secure data communication techniques.

Each of the secure devices 20, 30, . . . can be any device that includes a memory and a processor/controller. For example, each of the secure devices 20, 30, . . . can be any type of smart card such as SIM, USIM, UICC, R-UIM, CSIM, etc., a SD (Secure Digital) card, a USB device, a MMC (MultiMediaCard) card, a GPS device, a Bluetooth device, etc.

The servers A, B, C and other network devices 50 can be any server or device that desires to communicate with at least one of the secure devices 18, 20, 30 through the terminal 10. The servers 50 can be an application server (e.g., banking server), an operator server, any service provider's server, etc. For example, the server B may be an operator server which in turn communicates with other application servers such as the server C. Each of the servers 50 can include therein or communicate with one or more different applications/program modules/servers for respectively providing and managing different applications such as games, banking application, music, video, customization of terminal, etc. The network 40 can include a network server (e.g., SMS center) through which the servers 50 may need to go through to communicate with the terminal 10.

Figure 2:
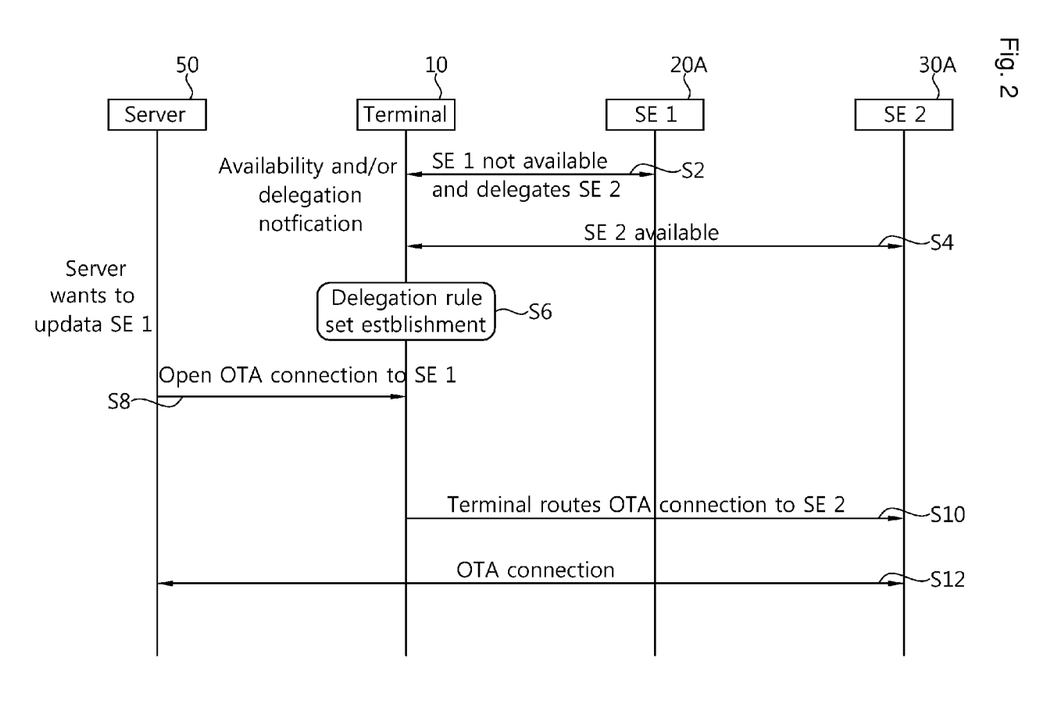
FIG. 2 is a flowchart illustrating a method for managing secure devices according to an embodiment of the present invention.
Figure 3:
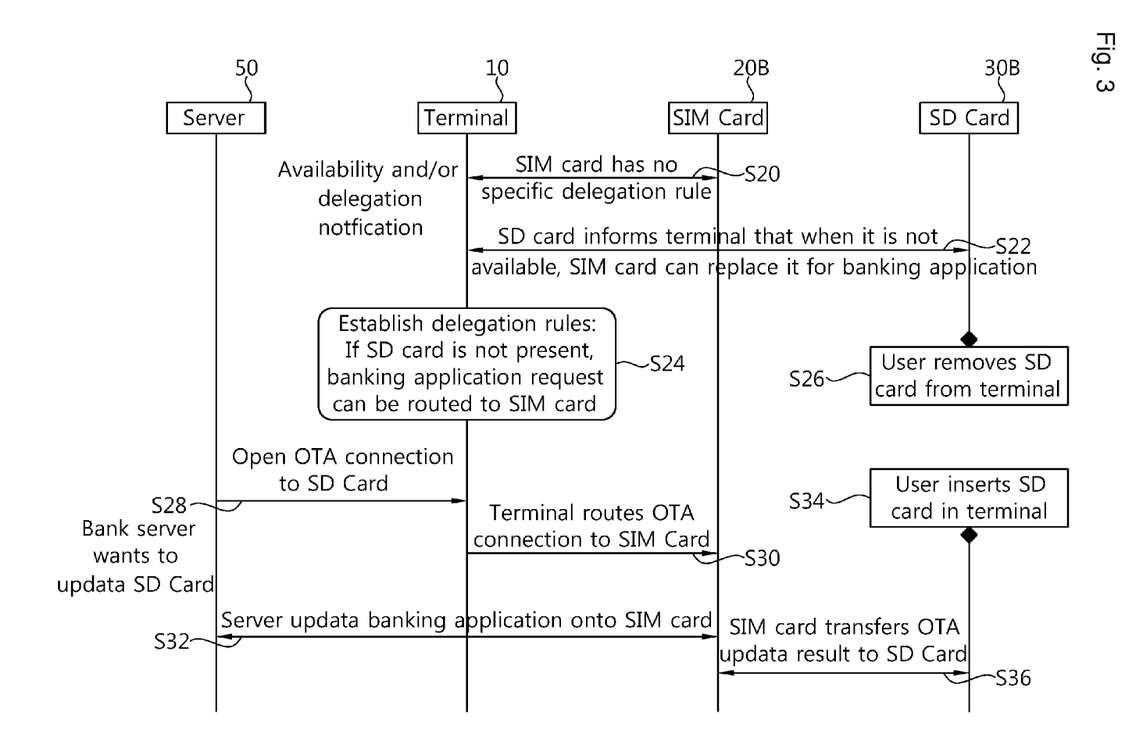
FIG. 3 is a flowchart illustrating a method for managing secure devices according to an embodiment of the present invention.
Figure 4:
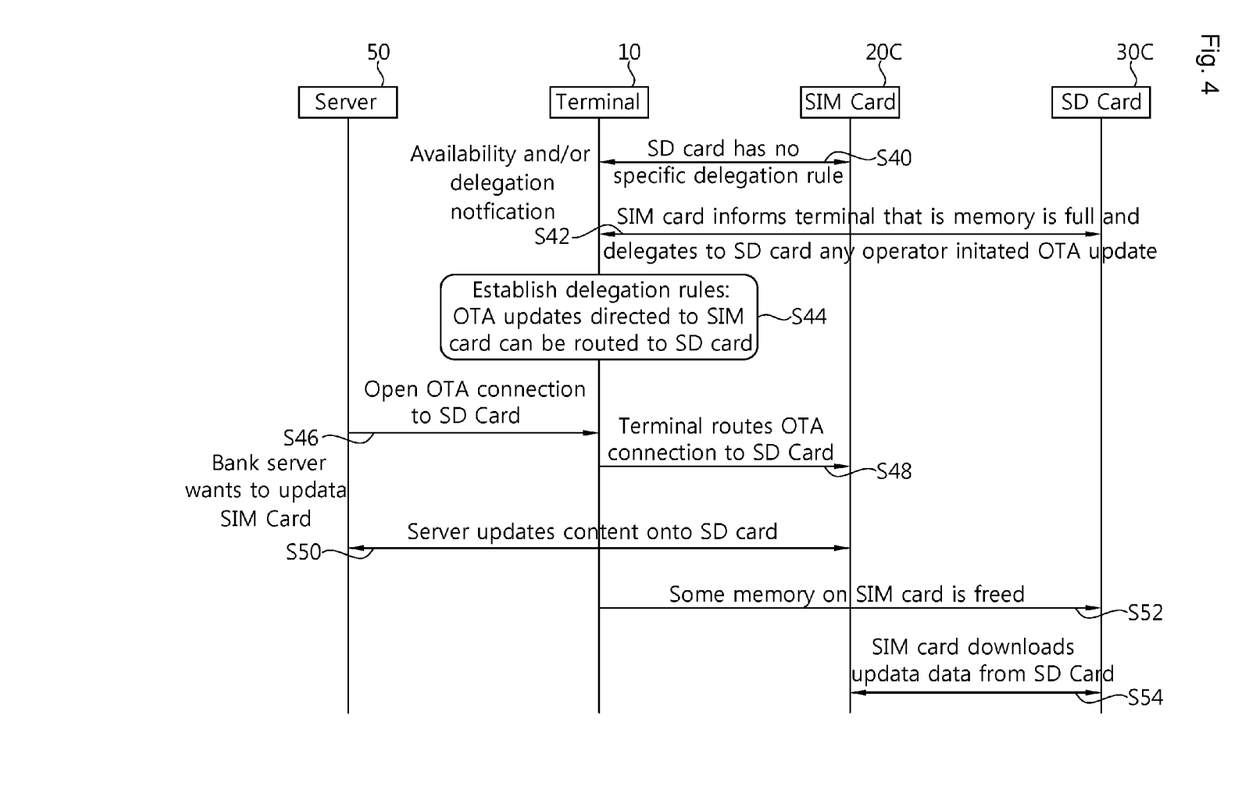
FIG. 4 is a flowchart illustrating a method for managing secure devices according to an embodiment of the present invention.

FIG. 2 is a flowchart illustrating a method for managing secure devices according to an embodiment of the present invention. The method of FIG. 2 and all other methods of the invention including the methods of FIGS. 3 and 4 to be discussed later, can be implemented in the system of FIG. 1 or in other suitable systems. In FIGS. 2-4, although only two secure devices and one server are shown, the system can have additional secure devices and servers that perform or can perform the same or similar steps of the invention. Further, the features discussed in connection with one embodiment, step or example are applicable to any other embodiment, step or example of the invention.

In the example of FIG. 2, a first secure device (SE1) 20A and a second secure device (SE2) 30A associated with the terminal 10 are provided. The first and second secure devices 20A and 30A can be any two of the secure devices 18, 20, 30 . . . of FIG. 1.

Referring to FIG. 2, at steps S2 and S4, each of the secure devices SE1, SE2 associated with the terminal 10 notifies the terminal 10 about their availability and/or delegation information. The availability information can indicate whether or not the corresponding secure device is available (e.g., it is electrically connected, its memory is not full, it is capable of performing a requested task, etc.). The delegation information can indicate if the corresponding secure devices has delegated a specific task or all tasks to another secure device. The delegation information may specify an event (or events) which would trigger the indicated delegation. For instance, the event may be the occurrence of unavailability or incapability of the corresponding secure device. Further, such availability and/or delegation information can include other information which may be used by the terminal 10 to delegate a task, e.g., indication whether or not the corresponding secure device is physically connected or plugged in (e.g., based on the detection of a connection status), information on any rights of the corresponding secure device, etc. The information received from each of the secure devices can be stored in the terminal 10.

The sending of such availability and/or delegation information from each of the secure devices to the terminal 10 (e.g., to the controller 11) may occur at any designated time, e.g., when the secure device is connected to the terminal 10, after the secure device is reset, when a certain set event occurs, or in response to a specific request from the terminal 10, etc.

In the example of step S2, the SE1 20A informs the terminal 10 that the SE1 is not available and thus delegates its role/responsibility to the SE2 30A. Here, both the availability information and delegation information of the SE1 are provided to the terminal 10. For instance, the SE1 may be unavailable because its memory is full or its capability is limited. If the SE1 is electrically disconnected from the terminal (e.g., the user removed or disconnected the SE1 from the terminal), then the terminal 10 may detect its disconnection as the availability information. Then the SE1 may appoint another secure device such as the SE2 to take on one or more responsibilities and roles of the SE1, since the SE1 is unavailable. The SE1 may appoint a specific secure device or can indicate that any subsequent secure device can be delegated. The SE1 may prestore such delegation information or may generate it accordingly. Here, it is assumed that the SE1 knows about what other secure devices are associated with the terminal. For instance, when each new secure device is plugged in or electrically connected to the terminal, its availability may be automatically communicated to the terminal which in turn informs all other secure devices about the presence of the new secure device. In this way, each secure device may know about the other secure devices that are associated with the terminal. Obviously, such information may be updated to indicate which devices have been removed from the terminal.

In the example of step S4, the SE2 may send only its availability information.

Steps S2 and S4 can occur using any known techniques or communication methods. For instance, the SE1 and SE2 can communicate its availability and/or delegation in formation to the terminal 10 via provisioning, e.g., factory provisioning, dynamic pro visioning such as DM (Device Management) provisioning, etc. In other examples, the controller 11 of the terminal 10 may request and access such information stored in each secure device.

At step S6, the terminal 10 establishes a secure device delegation rule set based on the availability and/or delegation information (and any other information, if needed) of each of the secure devices associated with the terminal 10. In one example, an initial delegation rule set can be prestored in the terminal 10 which may be modified based on the received availability and/or delegation information from each secure device. In another example, the terminal 10 may generate a delegation rule set based on the in formation received from each secure device, which may be updated as needed. If no delegation information is provided from the secure devices, the terminal 10 itself may delegate the secure devices according to a preset order or priority, which may vary depending on the application or need. Optionally, even if the delegation information is provided from the secure devices, the terminal 10 may override it if needed and delegate the secure devices according to its own rules. In another example, if none of the secure devices which are removable storage devices such as SIM, SD, etc. are available, then the terminal 10 may set the delegation rule set so that the secure device 18 of the terminal 10 itself may take on the responsibilities and roles of the unavailable secure devices, if feasible.

At step S8, when a particular server 50 (e.g., server 50A) desires to update contents of its secure device (e.g., SE1), the server 50 sends a request to establish communication to the terminal 10 via the network 40. For instance, if the server 50 desires to update data of the SE1 using an OTA operation via bearer independent protocol (BIP), then the server 50 may send an OTA connection request to the terminal 10. One example of such a request can be a PUSH SM message (a PUSH message used in a SMS context). However, other types of PUSH methods can be used such as a SIP PUSH, a UDP PUSH, etc. Any PUSH SM message and other SMS messages from the server 50 may need to go through a network server such as a SMS center in the network 40 to be sent to the terminal 10.

At step S10, the terminal 10 receives the OTA connection request (directed to the SE1) and routes the OTA connection request to the SE2 based on the secure device delegation rule set. For instance, in view of the unavailability of the SE1, the delegation information provided from the SE1 (which delegates its role to the SE2), and the availability of the SE2, the terminal 10 routes the OTA connection request directed to the SE1, to the SE2.

At step S12, an OTA connection is established between the SE2 and the server 50 through the terminal 10 according to known techniques. The processes of establishing an OTA connection between a secure device and a server and updating contents of the secure device through the OTA connection are well known and thus will not be discussed in detail. The format and use of various messages used in these processes can also be found in standardized documents such as TS 102 223, TS 102 226, etc. by ETSI (European Telecommunication Standard Institute).

At step S12, any desired action can be performed through the OTA connection. For instance, data can be exchanged, the server 50 can send update data or new data to the SE2, can install a new application, may request an action or data from the SE2, etc. Afterwards, the OTA connection may end.

If the SE1 becomes available subsequently, then the SE2 may transfer the update data and other information stored therein through the OTA connection, to the SE1 through the terminal 10. Accordingly, no task or incoming request is missed or not completed, and the terminal can effectively manage the various secure devices so that their resources can be shared with one another.

FIG. 3 is a flowchart illustrating a method for managing secure devices according to an embodiment of the present invention. In the example of FIG. 3, a first secure device 20B and a second secure device 30B associated with the terminal 10 are respectively a SIM card and a SD card. However, the secure devices 20B and 30B can be any two of the secure devices 18, 20, 30 . . . of FIG. 1.

FIG. 3 is directed to one examples of a scenario where a specific server 50 such as a banking server desires to update its application and information (e.g., certified keys, etc.) in its SD card provided in the terminal. If a user removes the SD card or the SD card is full, conventionally this updating process will fail. However, the present invention allows the updating process to be performed on another available secure device even if the SD card is not available. For instance, the application and in formation can thus be saved in the SIM card or in the internal memory of the terminal itself even if the SD card is not present or available. Subsequently, whenever the user inserts a new or old SD card in the terminal or the SD card's memory space becomes available, all information and applications saved in the SIM card or the internal memory of the terminal 10 are then transferred to the SD card. As a result, there is no interruption in the service or operation according to the present invention.

More specifically, referring to FIG. 3, at steps S20 and S22, each of the SIM card 20B and the SD card 30B associated with the terminal 10 notifies the terminal 10 about their availability and/or delegation information. For instance, at step S20, the SIM card 20B informs the terminal 10 that it has no specific delegation rule. At step S22, the SD card 30B informs the terminal 10 that when the SD card becomes unavailable, the SIM card is to be used instead, for banking applications. That is, the secure device may provide different delegations rules for different applications or events. Steps S20 and S22 can occur using any known provisioning techniques or other communication methods in the similar manner as steps S2 and S4 of FIG. 2.

At step S24, the terminal 10 establishes a secure device delegation rule set based on the availability and/or delegation information (and any other information, if needed) of each of the secure devices. For instance, the terminal 10 establishes the delegation rule set which indicates that if the SD card is not present, then all its banking application requests are to be routed to the SIM card.

At step S26, the SD card 30B may become unavailable, e.g., the user removes the SD card from the terminal 10, its memory becomes full, etc. Such unavailability of the SD card 30B is detected by the terminal 10 or notified to the terminal 10 by the SD card 30B (if not removed).

At step S28, when a particular server 50 (e.g., banking server) desires to update contents of its SD card, the server 50 sends a request to establish communication, to the terminal 10 via the network 40. For instance, the server 50 may send an OTA connection request to the terminal 10 using a PUSH message.

At step S30, the terminal 10 receives the OTA connection request (e.g., directed to the SD card) and routes the OTA connection request to the SIM card based on the secure device delegation rule set. If the SIM card is not available, then the OTA connection request can be routed to the secure device 18 of the terminal 10.

At step S32, since the SIM card 20B is available, an OTA connection is established between the SIM card 20B and the server 50 through the terminal 10 according to known techniques. The server 50 then stores the update data in the SIM card 20B through the OTA connection or may perform any other desired action in the SIM card 20B.

Steps S28, S30 and S32 can be the same as or similar to the steps S8, S10 and S12 of FIG. 2, respectively.

At step S34, when the terminal 10 determines that the SD card 30B is now available (e.g., the user inserted or electrically connected a new or old SD card to the terminal, the memory space of the SD card became free, etc.), then the SIM card 20B transfers the update data (data obtained through the OTA connection at step S32) to the SD card 30B at step S36 through the terminal 10. For instance, the controller 11 of the terminal 10 may access the update data stored in the SIM card 20B and transfer it to the SD card 30B after the SD card 30 becomes available again. Then the SD card 30B may perform suitable operations if needed based on the transferred data.

FIG. 4 is a flowchart illustrating a method for managing secure devices according to an embodiment of the present invention. In the example of FIG. 4, a first secure device 20C and a second secure device 30C associated with the terminal 10 are respectively a SD card and a SIM card. However, the secure devices 20C and 30C can be any two of the secure devices 18, 20, 30 . . . of FIG. 1.

FIG. 4 is directed to a scenario where a particular server such as an operator server 50 desires to update contents of its SIM card provided in the terminal. If the SIM card's memory is full or is not of sufficient size, conventionally this updating process will fail. However, the present invention allows the updating process to be performed on another available secure device even if the contents of the SIM card itself cannot be updated. For instance, the update data from the operator server can thus be saved in the SD card or in the internal memory of the terminal itself even if the SIM card is full. Subsequently, whenever the memory of the SIM card is freed, the update data previously stored in the SD card or the internal memory of the terminal 10 can be transferred to the SIM card. As a result, there is no interruption in the service or operation according to the present invention.

More specifically, referring to FIG. 4, at steps S40 and S42, each of the SD card 20C and the SIM card 30C associated with the terminal 10 notifies the terminal 10 about their availability and/or delegation information. For instance, at step S40, the SD card 20C informs the terminal 10 that it has no specific delegation rule. At step S42, the SIM card 30C informs the terminal 10 that when the SIM card's memory is full, the SD card is to be used instead, for any operator initiated OTA updates. That is, the secure device may provide different delegations rules for different events. Steps S40 and S42 can occur using any known provisioning techniques or other communication methods in the similar manner as step S2 and S4 of FIG. 2.

At step S44, the terminal 10 establishes a secure device delegation rule set based on the availability and/or delegation information (and any other information, if needed) of each of the secure devices. For instance, the terminal 10 establishes the delegation rule set which indicates that if the SIM card's memory is full, then all OTA updates targeting the SIM card are to be routed to the SD card.

At step S46, when a particular server 50 (e.g., operator server) desires to update contents of its SIM card, the server 50 sends a request to establish communication, to the terminal 10 via the network 40. For instance, the server 50 may send an OTA connection request to the terminal 10 using a PUSH message.

At step S48, the terminal 10 receives the OTA connection request (e.g., directed to the SIM card) and routes the OTA connection request to the SD card based on the secure device delegation rule set. If the SD card is not available or its memory is full, then the OTA connection request can be routed to the secure device 18 of the terminal 10.

At step S50, since the SD card 20C is available or its memory is not full, an OTA connection is established between the SD card 20C and the server 50 through the terminal 10 according to the known techniques. The server 50 then stores the update data in the SD card 20C through the OTA connection or may perform any other desired action in the SD card.

Steps S46, S48 and S50 can be the same as or similar to the steps S8, S10 and S12 of FIG. 2, respectively.

At step S52, when the terminal 10 determines that the SIM card's memory is freed or otherwise available, then the SD card 20C transfers the update data (data obtained through the OTA connection at step S50) to the SIM card 30C at step S54 through the terminal 10. For instance, the controller 11 of the terminal 10 may access the update data stored in the SD card 20C and transfer it to the SIM card 30C after the SIM card's memory space becomes available. Then the SIM card 30C may perform suitable operations if needed based on the transferred data.

According to embodiments, transferring the stored data/applications from one secure device to another secure device as discussed above can be moving the data/application from one secure device to another secure device, or copying the data/application in one secure device and storing a copy thereof in another secure device. In the copying case, both secure devices have the same information for future use. As a result, information (e.g., fees, applications, certification keys, etc.) may be shared among multiple secure devices according to the delegation rule set. Further, each secure device can select which information can be shared with other secure devices by appropriately setting its delegation rules. Further, each server may communicate to the terminal which of its in formation may only be shared with selected secure devices. For instance, the server may provide its own delegation rule to the terminal to be part of the secure device delegation rule set. For example, a banking server may prefer to store its contents in the internal memory of the terminal, if its associated secure device is not available. The secure devices, servers and terminal each may provide its own delegation rules, and if there is a conflict, such rules may be administered by the terminal according to a set order or priority.

Although in FIGS. 2-4, the OTA connection is used, the present invention is not limited thereto and other connections can be used to establish a communication channel between a server and a delegated secure device (e.g., SE2 in FIG. 2) after a terminal selects the delegated secure device as discussed above. For instance, a WAP connection using an APN may be used in which case a request from a server 50 may not need to go through a SMS center.

According to another embodiment, instead of the OTA connection of FIGS. 2-4, a SIP (Session Initiation Protocol) session may be used in each of FIGS. 2-4, and the SIP session is well known. In that case, for instance, at step S8 of FIG. 2, a particular server 50 may request a SIP session for updating contents (or performing some other action). Then the terminal 10 may send an INVITE message to the server 50 for re questing update data, and in return, the server 50 can send a response message such as a 200 OK message including the update data to the terminal 10. The terminal 10 then communicates with the delegated secure device (which has been selected according to the secure device delegation rule set) to store the update data in the delegated secure device.

In another example of using the SIP session, at step S8, the server 50 may send an INVITE message including update data to the terminal 10, and in return, the terminal 10 may send a response messages such as a 200 OK message to the server 50. Then the terminal 10 may store the update data in the delegated secure device. SIP protocols are commonly used and such various SIP-based messages for establishing a SIP session are well known.

According to embodiments, in each of the secure devices, various contents may be stored, updated, and/or executed by appropriate server(s) using the methods discussed above. Examples of contents that can be stored in the secure devices can be types of applications (e.g., NFC (Near Field communication) applications, RSA or other cryptography applications, data/communication protection applications, banking applications, memory applications, backup applications, video applications, music applications, streaming applications, etc.), one or more such applications or related data, manufacturer and version of the applications, capabilities of the applications, etc., subscriber information, service provider information, service information, etc.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The present invention may be applicable to a terminal having a plurality of secure devices associated with it.

The invention claimed is:

1. A method for managing communication between a server and a subscriber identification module (SIM) card associated with a mobile terminal by using the mobile terminal, the method comprising:
    acquiring first availability information indicating whether a first SIM card is available and second availability information indicating whether a second SIM card is available, wherein the first SIM card and the second SIM card are equipped in a same mobile terminal;
    establishing a SIM card delegation rule based on the first availability information and the second availability information;
    receiving a request for establishing a communication connection with the first SIM card from the server;
    if the first SIM card is determined to be available, establishing a communication connection between the server and the first SIM card; and
    if the first SIM card is determined to be unavailable and the second SIM card is determined to be used instead of the first SIM card based on the SIM card delegation rule, determining whether the second SIM card is available, and establishing a communication connection between the server and the second SIM card if the second SIM card is determined to be available.

2. The method of claim 1, further comprising:
    if the first SIM card is determined to be unavailable, storing update information from the server in the second SIM card through the established communication connection; and
    transferring the stored update information from the second SIM card to the first SIM card once the first SIM card is available.

3. The method of claim 1, wherein the communication connection is an over the air (OTA) connection or a Session Initiation Protocol (SIP) session.

4. The method of claim 1, wherein the first availability information is acquired from the first SIM card, and the second availability information is acquired from the second SIM card.

5. The method of claim 4, further comprising:
    acquiring, from the first SIM card, first delegation information indicating a SIM card to be used instead of the first SIM card when the first SIM card is unavailable; and
    acquiring, from the second SIM card, second delegation information indicating a SIM card to be used instead of the second SIM card when the second SIM card is unavailable,
    wherein the SIM card delegation rule is established further based on the first delegation information and second delegation information.

6. The method of claim 1, wherein the first SIM card is determined to be unavailable when a memory of the first SIM card is full.

7. A mobile terminal for managing communication between a server and a subscriber identification module (SIM) card associated with the mobile terminal, comprising:
    a first SIM card and a second SIM card equipped in the mobile terminal;
    a transceiver configured to transmit or receive a signal; and
    a controller coupled to the first SIM card, the second SIM card, and the transceiver and configured to:
        acquire first availability information indicating whether a first SIM card is available and second availability information indicating whether a second SIM card is available;

establish a SIM card delegation rule based on the first availability information and the second availability information;

receive a request for establishing a communication connection with the first SIM card from the server;

if the first SIM card is determined to be available, establish a communication connection between the server and the first SIM card; and if the first SIM card is determined to be unavailable and the second SIM card is determined to be used instead of the first SIM card based on the SIM card delegation rule, determine whether the second SIM card is available, and establish a communication connection between the server and the second SIM card if the second SIM card is determined to be available.

* * * * *